United States Patent
Lucidarme et al.

(10) Patent No.: US 11,694,170 B2
(45) Date of Patent: Jul. 4, 2023

(54) METHOD FOR PROCESSING DATA AND APPARATUSES FOR IMPLEMENTING THE SAME

(71) Applicant: ELECTRICITE DE FRANCE, Paris (FR)

(72) Inventors: Thierry Lucidarme, Chevreuse (FR); Stephane Dupre la Tour, Saint-Germain en Laye (FR); Julian Nolan, Lausanne (CH); Matthew Lawrenson, Lausanne (CH); Bernadette Elliott-Bowman, Lausanne (CH)

(73) Assignee: ELECTRICITE DE FRANCE, Paris (FR)

( * ) Notice: Subject to any disclaimer, the term of this patent is extended or adjusted under 35 U.S.C. 154(b) by 512 days.

(21) Appl. No.: 16/674,217

(22) Filed: Nov. 5, 2019

(65) Prior Publication Data
US 2020/0143338 A1 May 7, 2020

(30) Foreign Application Priority Data
Nov. 6, 2018 (EP) .................................. 18306456

(51) Int. Cl.
*G06Q 20/06* (2012.01)
*G06Q 20/36* (2012.01)
(Continued)

(52) U.S. Cl.
CPC .......... *G06Q 20/065* (2013.01); *G06Q 20/36* (2013.01); *H04L 9/14* (2013.01); *H04L 9/3236* (2013.01); *H04L 9/50* (2022.05); *H04L 2209/56* (2013.01)

(58) Field of Classification Search
None
See application file for complete search history.

(56) References Cited

U.S. PATENT DOCUMENTS

| 10,452,863 B2* | 10/2019 | Miller | G06Q 20/382 |
| 10,649,429 B2* | 5/2020 | Orsini | G05B 19/042 |

(Continued)

FOREIGN PATENT DOCUMENTS

| EP | 3526671 B1 * | 6/2021 | H04L 63/123 |
| WO | WO-2018073564 A1 * | 4/2018 | H04L 63/123 |

OTHER PUBLICATIONS

Zhang, Chenghua, "Peer-to-Peer Energy Trading in Electrical Distribution Networks", 2017, entire document (Year: 2017).*

(Continued)

*Primary Examiner* — Christopher Bridges
(74) *Attorney, Agent, or Firm* — Faegre Drinker Biddle & Reath LLP

(57) ABSTRACT

A computer-implemented method is provided comprising: generating a digital data block comprising transaction data representing at least one energy transfer transaction corresponding to an exchange of charge between a community member device and a charge source device, randomly selecting, in a group of community member devices, a plurality of block verification devices, wherein the block verification devices form a subgroup of block verification devices, partitioning a block verification computation task for the digital data block into a plurality of block verification computation subtasks, assigning the block verification computation so subtasks to respective selected block verification devices, transmitting the digital data block to each selected block verification device, together with its respective block verification computation subtask over a computer network, determining that the digital data block is verified, based on at least one verification results of a corresponding block verification computation subtask, and adding the verified block to a blockchain-enabled storage system.

19 Claims, 6 Drawing Sheets

(51) Int. Cl.
*H04L 9/14* (2006.01)
*H04L 9/32* (2006.01)
*H04L 9/00* (2022.01)

(56) References Cited

U.S. PATENT DOCUMENTS

| | | | | |
|---|---|---|---|---|
| 10,740,733 | B2* | 8/2020 | Moir | G06Q 20/3825 |
| 10,926,659 | B2* | 2/2021 | Lee | B60L 53/51 |
| 2020/0162264 | A1* | 5/2020 | Zamani | H04L 9/3247 |
| 2021/0194245 | A1* | 6/2021 | Tobin | G06F 1/26 |

OTHER PUBLICATIONS

Buterin, "Ethereum: Platform Review Opportunities and Challenges for Private and Consortium Blockchains," Jun. 1, 2016, retrieved from internet website: http://www.smallake.kr/wp-content/uploads/2016/06/314477721-Ethereum-Platform-Review-Opportunities-and-Challenges-for-Private-and-Consortium-Blockchains.pdf on Apr. 15, 2019, pp. 1-44.

Han et al., "Jupiter: A Blockchain 1-15 Platform for Mobile Devices," 2018 IEEE 34th International Conference on Data Engineering (ICDE), IEEE, Apr. 16, 2018, pp. 1649-1652.

Kang et al., "Enabling Localized 1-15 Peer-to-Peer Electricity Trading Among Plug-in Hybrid Electric Vehicles Using Consortium Blockchains", IEEE Transactions on Industrial Informatics, May 29, 2017, vol. 13, No. 6, pp. 3154-3203.

Vanting, "The biggest problem with blockchain and how to solve it, illustrated," Mar. 22, 2018, retrieved from internet website: https://www.techinasia.com/biggest-problem-blockchain-company-solving on Apr. 15, 2019, 11 pages.

European Search Report issued in related application EP 18306456.7, dated Apr. 15, 2019, 10 pages.

* cited by examiner

METHOD FOR PROCESSING DATA AND APPARATUSES FOR IMPLEMENTING THE SAME

CROSS-REFERENCE TO RELATED APPLICATION

This application claims priority benefit under 35 U.S.C. § 119(d) from European Patent Application No. 18306456.7, filed Nov. 6, 2018, the disclosure of which is incorporated by reference herein in its entirety.

FIELD

The present disclosure relates to the field of data processing, in particular processing of data representing digital charge transactions.

BACKGROUND

A blockchain is a distributed digital ledger that stores transactions between users chronologically, in such a way that the recorded data is verifiable and immutable. Transactions are written into a public ledger that is maintained by a group of decentralised computers or nodes, each in possession of an identical copy of the ledger. Changes to the ledger are recorded by all nodes, making it essentially impossible to create fraudulent transactions. As a result of this process, the blockchain technology is described as trust-less because it removes the need for a third party to manage transactions between two users.

Different distributed consensus protocols have been developed for the addition of new blocks (corresponding to one or more transactions) into a blockchain ledger, which may be classified into two main types, known as proof of work (POW) protocols, and proof of stake (POS) protocols.

In proof of work protocols, the validity of each new block is verified by users ("miners") solving a complex mathematical problem. The mathematical problem is difficult to solve (requiring significant computing power and therefore energy expenditure) but easy to check once solved. The first miner to solve the problem is rewarded with an amount of cryptocurrency. The security of a PoW network is ensured by the prohibitively high processing requirements that would be associated with an attempted hack on such a network, the costs of which would be higher than any reward that might be obtained through a successful attack. However, PoW systems have an inherent environmental impact, which led to the development of alternative, more energy efficient, consensus protocols.

Proof of stake protocols are an example of such protocols, and were developed to address the power consumption problems of PoW. Instead of adding blocks to the ledger via a complex mathematical problem, mining power is determined by a miner's proportion of coins, or stake. By demonstrating ownership of a certain percentage of cryptocurrency, a miner is permitted to mine an equivalent percentage of transactions in the PoS system. Rather than a cryptocurrency reward as in PoW, PoS contributors earn the transaction fee associated with a particular block. The security of the system is maintained because each PoS contributor (known as a "forger") is required to lay down their own assets to take part in transaction verification, with the risk of losing their stake if they validate an illegitimate transaction. Proof of Stake also protects against "51% attacks" which can affect PoW systems, whereby a user possessing a disproportionate amount of cryptocurrency can result in a form of centralisation of the network. In a PoS system, a user would need to possess an extremely large amount of cryptocurrency in order to do initiate such an attack.

Peer to Peer (P2P) energy transactions are a method of transferring charge directly between two users or entities. The system is being investigated for use in distributed electric vehicle (autonomous or otherwise) charging; as an example, a homeowner in possession of electric vehicle charging equipment may offer electricity to a passing electric vehicle for a fee.

In the future, electric vehicles may take part in energy transfer transactions over the course of a journey as and when they require power or power is required from them. Many micro-transactions may take place over a relatively short period of time, and each transaction must be accurately and verifiably recorded without causing unnecessary inconvenience to vehicle owners.

Known consensus protocols such as POW and POS may not be well adapted for accurately and verifiably recording a large number of micro-transactions, such as what may occur in the energy transfer environment in a near future.

There is therefore a need for providing an improved data processing scheme and apparatuses implementing the same that address at least some of the above-described drawbacks and shortcomings of the conventional technology in the art.

SUMMARY

It is an object of the present subject disclosure to provide an improved data processing scheme and apparatuses implementing the same.

Another object of the present subject disclosure is to provide an improved data processing scheme for processing transaction data using a blockchain and apparatuses implementing the same for alleviating the above-described drawbacks and shortcomings of conventional data processing schemes using a blockchain, in particular in cases where large numbers of micro-transactions result in large amounts of transaction data to be processed using the blockchain.

Yet another object of the present subject disclosure is to provide an improved data processing scheme for processing transaction data using a blockchain and apparatuses implementing the same for alleviating the above-described drawbacks and shortcomings of conventional data processing schemes using a blockchain, in particular for the processing of data related to charge transactions.

To achieve these objects and other advantages and in accordance with the purpose of the present subject disclosure, as embodied and broadly described herein, in one aspect of the present subject disclosure, a computer-implemented method is proposed. The method comprises: generating a digital data block comprising transaction data representing at least one energy transfer transaction corresponding to an exchange of charge between a community member device and a charge source device; randomly selecting, in a group of community member devices, a plurality of block verification devices, wherein the block verification devices form a subgroup of block verification devices; partitioning a block verification computation task for the digital data block into a plurality of block verification computation subtasks; assigning the block verification computation subtasks to respective selected block verification devices of the subgroup of block verification devices; transmitting the digital data block to each selected block verification device, together with its respective block verification computation subtask over a computer network; receiving, from each selected block verification device, respective block verification results, over the computer network; determining that the digital data block is verified, based on the respective verification results; adding the verified block to a blockchain-enabled storage system in response to the determining that the digital data block is verified, wherein each device of the group of community member devices requires electric charge to function and/or is capable of providing electric charge to other devices, and wherein each device of the group of community member devices has the capability to connect to the computer network, and includes a computer system which is a node of the computer network.

The proposed method advantageously provides a low-energy, device-enabled blockchain consensus management system which is particularly well suited for the verification and storage of peer-to-peer energy transactions.

In the future, electric vehicles are likely to become more prevalent on our roads and will require appropriate infrastructure to support them. Further, increasingly autonomous devices will be able to share information and resources without the need for human oversight, which presents opportunities for intelligent energy trading systems on a device-to-device basis. However, users require an accurate record of any transaction that might take place in order for funds to be transferred as required, but do not want the inconvenience of having to monitor all transactions manually, or they want to perform such transactions with minimum human to devices interactions. The present subject disclosure addresses this issue through a method, computer program product, and apparatuses that advantageously enable a device-managed peer-to-peer energy transfer ledger. Through the use of a novel blockchain consensus mechanism, devices may verify transactions across an energy network, enabling users to sell and acquire energy securely and conveniently.

Indeed, known consensus mechanisms require a significant amount of work to be done by contributing users, typically by undertaking an energy-intensive calculation or by owning a sufficiently large cryptocurrency stake. By distributing the computational task (work) required by the blockchain to verify a new block among several (typically a large number of) devices, the blockchain consensus mechanism proposed in the present subject disclosure advantageously minimises the energy expenditure of contributing devices in a device-to-device energy transfer system, thereby allowing many devices, including devices with low computation power yet still capable of taking part in an device-to-device energy transfer transaction, to participate.

In addition, the blockchain consensus mechanism proposed in the present subject disclosure advantageously uses a random selection of the participating devices to which a computational task is to be distributed, thereby alleviating the risk associated with devices being susceptible to malicious control through hacking. Such random selection, renewed for each new task to be completed, advantageously secures a blockchain ledger maintained solely by devices as proposed in the present subject disclosure against such a threat to prevent the blockchain from being fraudulently altered.

In some embodiments, the energy transfer transaction includes a transfer of charge to the device from the charge source, wherein the charge source is an in-road inductive charger, a wired charger, or a charge source vehicle.

In some embodiments, the proposed method further comprises: assigning to each selected block verification device a respective subset of nonce values to be tested by the selected block verification device, and transmitting to each selected block verification device information related to its assigned subset of nonce values.

The subtask assigned to each selected block verification device may then advantageously comprise the testing of nonce values included the subset of nonce values assigned to such device. Information related to its assigned subset of nonce values may be transmitted to the device so that the device may generate its subset based on such received information, and complete its subtask.

In some embodiments, the assigning a respective subset of nonce values to a selected block verification device is based on verification resource information of the selected block verification device, so that information specific to a device may be taken into account in the assigning respective subtasks to each device.

In some embodiments, each block verification device of the subgroup of at least one block verification device is selected in a subgroup of active devices of the group of community member devices, wherein each active device of the subgroup of active devices has taken part in a charge transaction within a predetermined time period. In this manner, devices which were involved in a charge transactions within a predetermined period (e.g. in the last hour, in the last 24 hours, or in the last week), may advantageously be preselected for the device cohort, before being randomly selected to be members of the device cohort.

In some embodiments, the transaction data represents a plurality of energy transfer transactions of the community member device. This advantageously allows generating new blocks that may include more than one energy transfer transaction for the community member device. Alternatively, the transaction data may represent a plurality of energy transfer transactions related to a plurality of community member devices.

In some embodiments, the selecting the block verification devices further comprises: selecting, in the subgroup of block verification devices, a plurality of candidate block verification devices; obtaining, for at least one of the candidate block verification devices, verification resource information indicating an ability of the at least one candidate block verification device to be a resource for a block verification. The assigning the block verification computation subtasks to respective selected block verification devices may then comprise the assigning a block verification computation subtask to the candidate block verification device based on the verification resource information.

Advantageously, a subsequent selection of devices randomly selected to be part of the device cohort may be performed, based on information specific to each device, which allows adjusting the random selection to take into account information specific to devices randomly selected.

Depending on the embodiment, such device-specific information, that is, the the verification resource information, may comprise battery charge status information indicating a status of battery charge, computation power information indicating computational capabilities, and/or occupation status information indicating a state of computation occupation.

In some embodiment, the verification resource information for the candidate block verification device may be obtained from a database stored in one or more nodes of the computer network.

In some embodiments, the verification resource information for the candidate block verification device may be obtained from a response message received from the candidate block verification device, further to a transmission to the candidate block verification device of a query message for the verification resource information.

In some embodiments, the verification resource information may include computation power information indicating computational capabilities for a respective candidate block verification device, and respective verification resource information is obtained for a plurality of candidate block verification devices, the method further comprising: selecting the plurality of candidate block verification devices to generate a plurality of subsets of candidate block verification devices having respective computational capabilities, wherein each subset of candidate block verification devices represents a respective predetermined proportion of the selected plurality of candidate block verification devices.

In some embodiments, the verification resource information may include occupation status information indicating a state of computation occupation, the method further comprising: selecting the plurality of candidate block verification devices among the candidate block verification devices the occupation status information of which indicates an idle computation occupation.

In some embodiments, the verification resource information may include battery charge status information indicating a battery charge level, the method further comprising: selecting the plurality of candidate block verification devices among the candidate block verification devices with a battery charge level beyond a battery charge level threshold. Advantageously, the battery charge level threshold may be dynamically determined based on a candidate block verification computation subtask.

Preferably, each of the block verification computation subtask will be assigned to a respective selected block verification device.

In another aspect of the present subject disclosure, an apparatus is proposed, which comprises a processor, a memory operatively coupled to the processor, and network interfaces to communicate in a computer network, wherein the apparatus is configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed. In another aspect of the present subject disclosure, a data set representing, for example through compression or encoding, a computer program as proposed herein, is proposed.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DETAILED DESCRIPTION

Figure 1:
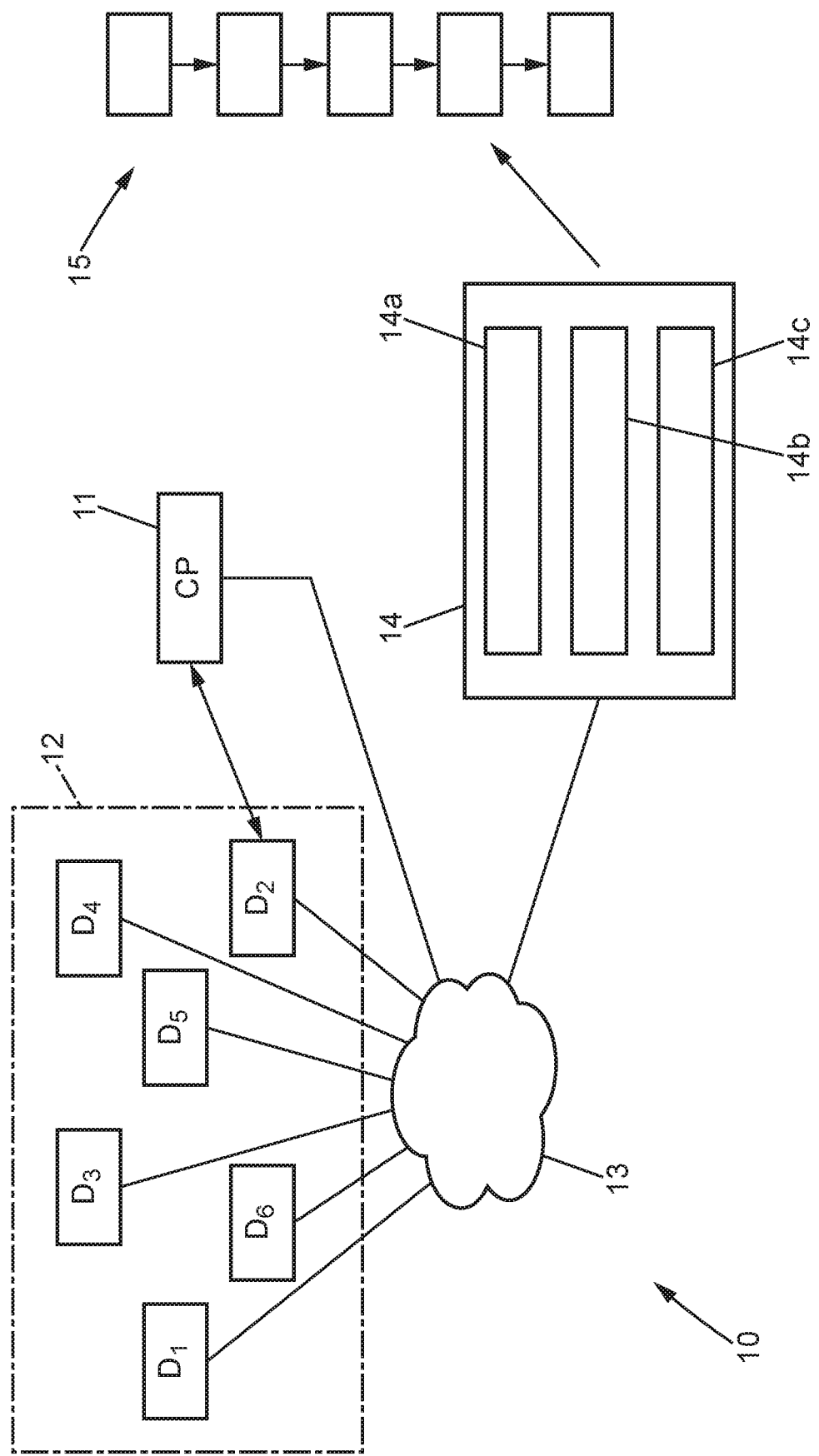
FIG. 1 shows an exemplary system in which the proposed method may be used in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms «memory» and «computer storage media" include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Python, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be indifferently used to indicate that two or more elements are in direct physical or electrical contact with each other, or two or more elements are not in direct contact with each other, but yet still co-operate or interact with each other.

In the following description and claims, the terms "payload", "payload data", "message", "packet", and "data packet" may be indifferently used, and may include data blocks, protocol data units or any unit of data that may be routed or transmitted between nodes or stations or across a network. A packet may include a group of bits, which may include one or more address fields, control fields and data, for example. A data block may be any unit of data or information bits.

For the purposes of the present disclosure, the term "server" is used herein to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of the present disclosure, a "computer network" should be understood to refer to a network that may couple devices (also referred to herein as "nodes") so that data communications may occur between devices, including between wireless devices coupled via a wireless network, for example. A network may also include mass storage, such as network attached storage (NAS), a storage area network (SAN), or other forms of computer or machine readable media, for example, and may include or be connected to a server. A network may include the Internet, one or more local area networks (LANs), one or more wide area networks (WANs), wire-line type connections, wireless type connections, cellular, such as carrier telephone lines, optical fibers, synchronous optical networks, synchronous digital hierarchy links, powerline communication links (e.g. IEEE 61334, IEEE P1901.2), Ethernet, Bluetooth, Bluetooth Low Energy (BLE) or Bluetooth Smart, WiFi or any connection based on a IEEE802.11x protocols, ZigBee or any connection based on the IEEE802.15.4 protocol, Z-Wave, 6LowPAN (IPv6 Low-power wireless Personal Area Network), Thread, Sigfox, Neul, LoRa, any NFC connection, 2G (including GSM/GPRS/EDGE)/3G (including UMTS/HSPA)/4G (including LTE and LTE-Advanced)/5G cellular, or any combination thereof. Various types of devices, for example gateways, may be made available to provide an interoperable capability for differing architectures or protocols used in the network. Any number of nodes, devices, apparatuses, links, interconnections, etc. may be used in a computer network according to the present subject disclosure.

A communication link or channel may include, for example, analog telephone lines, full or fractional digital lines, wireless links including satellite links, or other communication links or channels, such as may be known to those skilled in the art.

It should be understood that embodiments of the present subject disclosure may be used in a variety of applications. Although the present subject disclosure is not limited in this respect, the method for processing transaction data disclosed herein may be used in many apparatuses such as in any device having some computational power and configured to participate in transactions, including software transactions (e.g. transactions known as "smart contracts"), for example, computer program instructions which, when provided to a computer system comprising a processor and executed, cause said computer to perform a function related to a digital transaction. For clarity, the following description focuses on the context of peer-to-peer energy transfer transactions. However, technical features of the present subject disclosure are not limited thereto.

FIG. 1 shows an exemplary system (10) in which the system, computer program product, and method proposed in the present subject disclosure may be implemented.

The system (10) of FIG. 1 includes, without being limited to, a group of devices D1, D2, . . . , D6, (referred to as "community members" in the following) that require electric charge to function and/or able to provide an electric charge and participate in energy transfer transactions (referred to as "charge transactions" in the following) with other devices (11) (referred to as "charge providers" in the following) to acquire charge.

Examples of devices include, but are not limited to, any device configured with a processing unit for providing computational power, and which may be involved in energy transfer transactions for collecting energy and/or providing energy, such as, electronic (including mobile) devices (smartphones, tablets, laptop computers, phablets, PDA devices, drones, cameras, etc.), electric vehicles (electric and/or hybrid cars, trucks, buses, delivery autonomous vehicles, scooters and bicycles), etc.

For clarity, the following description focuses on peer-to-peer electric charge transfer transactions between electric vehicles (also referred to herein as "V2V transactions"). However, technical features of the present subject disclosure are not limited thereto.

The group of devices D1, D2, D3, D4, D5, and D6 form a so-called charging device community (12), which in embodiments may be formed of a large number of connected electric devices, each with the capability to connect to a communication network (13) and having some computational power. Each of the devices D1-D6 may include a computer system (not shown on the figure) configured for performing computations upon request according to the consensus protocol provided herein. Typical community members may include (but are not limited to) electric cars, trucks, buses, delivery autonomous vehicles, scooters and bicycles.

The system (10) may be operated to provide a service to end users using community member devices, such as, for example, a peer-to-peer energy transaction service or a V2V charge service. Depending on the embodiment, such service may be provided by an energy distribution operator, acting as primary energy provider for providing energy to the community member devices, or by a broker, possibly independently from any primary energy provider, providing a service in association with one or more primary energy providers which may provide energy to the community member devices.

The system (10) may use a registration/deregistration scheme through which device users may register their device(s) to belong to the charging device community (12). The charging device community (12) may then comprise registered devices, and information (such as login credentials, identification information, profile information, etc.) regarding each registered device may be stored in a database (not shown on the figure) of a server (14).

The system (10) may also include a user interface environment (not shown on the figure), for example through a mobile app and/or through a browser interface, for users to interact with various functions of the system (10) as part of the service provided thereby.

The system (10) may use different types of charge providers: A Charge Provider (11) may be a device external to the charging device community (12) (D1, D2, D3, D4, D5, and D6), such as a charging point, which provides charge but does not need to acquire it through the system (10). Another device in the charging device community (12), such as an electric vehicle, that can provide charge but also needs to acquire it when necessary, may also operate as a charge provider in the system (10).

An exchange of charge, whereby a community member (D2) acquires charge from a charging device (11), may trigger at the charging device (11) execution of a software entity for creating a set of data representing a corresponding charge transaction between the community member (D2) and the charging device (11).

Depending on the type of charge provider device involved in the transaction, a charge transaction may include a transfer of charge, for example including to a vehicle from in-road inductive chargers, to a vehicle from "quick-clamp" wired chargers while stationary, or between two vehicles. The vehicles can also be moving and the charge can be done through a physical link with a car to car refueling mechanism.

Each device (D1, D2, D3, D4, D5, and D6) of the charging device community (12) may be configured for data communication through the communication network (13) with a server (14), which is also communicatively connected to the communication network (13).

The charging device (11) will also typically include a computer system, configured for generating the set of data representing the charge transaction (referred to as "transaction data" in the following), and for transmitting such transaction data to the server (14), through the communication network (13).

In one or more embodiments, the transaction data for a P2P charge transaction (for example where the charging device is an electric vehicle) may comprise data identifying the charging device, and data representing an amount of charge provided by the charging device according to the transaction. The data identifying the charging device may comprise a registration identification data of the charging device as community member device registered in the system (10).

In some embodiments, the transaction data for a P2P charge transaction may further comprise data identifying the charged device, in particular whenever the charged device is also a community member device.

The system (10) further includes a ledger (15) (referred to as "energy transfer ledger" in the following), which is a data record of charge transactions that have been verified prior to being added in the ledger using a consensus protocol. The energy transfer ledger (15) may be implemented as a blockchain storage system used to record the various charging transactions that occur between community members and Charge Providers. Each Charging Transaction may be processed, included verified, to be added to the energy transfer ledger as a block (a "transaction block") through a device consensus verification process according to the present subject disclosure.

In one or more embodiments, the system (10) may be configured to execute a cohort selection algorithm through a cohort selection function (14a), transaction block creations through a transaction block creation function (14b), and a device consensus algorithm through a device consensus function (14c).

In one or more embodiments, the cohort selection function (14a) may be configured as a software entity, running on the server (14) in the exemplary embodiment shown on FIG. 1, executing a cohort selection algorithm which may be used to randomly select a subgroup of devices from the charging device community (12) (referred to as the "device cohort" in the following). The random selection of devices from the charging device community (12) advantageously ensures that the membership of a particular device cohort is impossible to predict, and is different each time a new device cohort is selected, that is, each time a new transaction block is to be added to the energy transfer ledger (15).

Depending on the embodiment, the members of the device cohort may be drawn from, for example, only those community members who have been active (i.e. taken part in a Charge Transaction) within a specified time period (e.g. a day), or, alternatively, all known community members.

In one or more embodiments, the transaction block creation function (14b) may be configured as a software entity, running on the server (14) in the exemplary embodiment shown on FIG. 1, executing a transaction block creation algorithm for compiling one or several transaction data Sets into one or several transaction blocks, further to the receiving the one or several transaction data Sets. That is, a transaction block may include several transaction data sets respectively corresponding to several charging transactions. Alternatively, the transaction block creation function (14b) may be configured so that a new transaction block is created for each new charging transaction.

In other embodiments, the transaction block creation function (14b) may be configured as one or more software entities, each configured to run on different platforms, such as a platform of a device of the charging device community (12), the server (14) platform, and/or a charge provider device plateform.

In some embodiments, the transaction block creation function (14b) may be configured to compile transaction blocks to include relevant identifying data, such as transaction value, transaction type, timestamp information for the transaction (e.g. date and time of the transaction), a geographical location for the transaction, and/or a charge provider party and/or a charge receiver party in the transaction.

In some embodiments, the transaction block creation function (14b) may be configured to compile multiple charging transactions into a single transaction block, which may or may not be related to each other by any of the above parameters.

In one or more embodiments, the device consensus function (14c) may also be configured as a software entity, running on the server (14) in the exemplary embodiment shown on FIG. 1, executing a device consensus algorithm for controlling the verifying of new transaction blocks prior to their insertion into the energy transfer ledger. In some embodiments, the control performed by the device consensus function (14c) may include the allocating respective subtasks to selected cohort devices (i.e. devices selected by the cohort selection function to be part of the device cohort), as described below in further details.

In some embodiments, to achieve consensus, a plurality or all of the members of a device cohort, as defined by the cohort selection algorithm, may contribute to the completion of a verification task (the "work task"). The work task may be, for example, a calculation, or a processing job, such as analysis of a whole or portion of an image.

The contribution of each device of the device cohort will preferably be designed to be small so as to minimise the energy expenditure required per device. As a result, the device cohort may be dimensioned with a large number of members.

Compared to the POW consensus mechanism, the amount of work that is completed overall can advantageously be minimised, as the inherent security of the present system is generated through the participation of many devices in the consensus mechanism. The present subject disclosure therefore advantageously provides a new way of reaching a tradeoff between security and global energy consumption.

As the members of the device cohort may typically number in the thousands in embodiments, it is unlikely that a single entity may have control of sufficient cohort members to be able to create fraudulent transactions.

It will be appreciated by those having ordinary skill in the relevant art that any suitable (preferably large) number of community members may be used in place of the charging device community (12) used in FIG. 1 which is given by way of example only.

Figure 2:
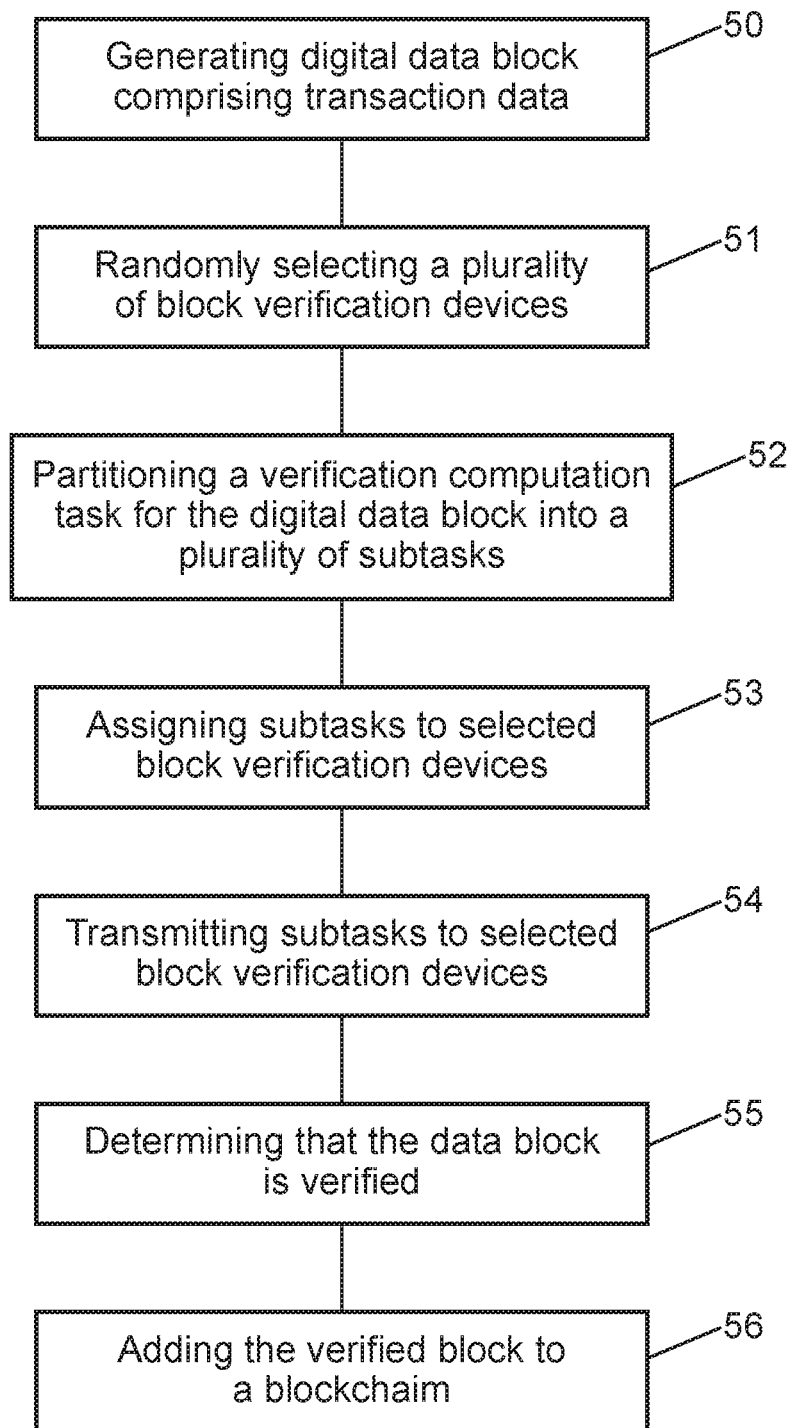
FIG. 2 is a block diagram illustrating a proposed method according to one or more embodiments.

FIG. 2 illustrates a method according to one or more embodiments of the present subject disclosure.

As shown on FIG. 2, upon execution of an energy transfer transaction corresponding to an exchange of charge between a community member device and a charge source device, a digital data block comprising transaction data representing the energy transfer transaction is generated (50).

The digital data block needs to be verified prior to be inserted in a blockchain-enabled storage system, possibly after further processing other than for purposes of verification.

The proposed verification scheme includes a randomly selecting (51), in a group of community member devices, a plurality of block verification devices, wherein the block verification devices form a subgroup of block verification devices. In some embodiments, not all community member devices in a group of community member devices may qualify as a candidate block verification device, so that a group of community member devices may include a group of candidate block verification devices, and a random selection within the group of candidate block verification devices may result in selected candidate block verification devices forming a subgroup of the group of candidate block verification devices. In some embodiments, the group of community member devices may be composed of devices that require electric charge to function and/or are capable of providing electric charge to other devices. Further, each device of the group of community member devices may be configured to have the capability to connect to a computer network, and to include a computer system which is a node of the computer network.

The blockchain-enabled storage system may be configured so that the insertion of a new block into the blockchain may be conditioned to the new block being verified, or validated, through a verification protocol which may involve completing a work, that is, a computation task. According to the present subject disclosure, such a block verification computation task may be partitioned (52) into a plurality of block verification computation subtasks. As a consequence, the computation task may be shared among a plurality of block verification devices, each with its own computation capabilities, through the block verification computation subtasks.

Once the block verification computation subtasks determined through the partitioning of the block verification computation task, or as the block verification computation subtasks are determined, the block verification computation subtasks may be assigned (53) to respective selected block verification devices of the subgroup of block verification devices.

The digital data block may then be transmitted (54) to each selected block verification device, together with its respective block verification computation subtask over a computer network, and at least one set of block verification results may be received, that corresponds to one of the subtasks transmitted to the selected block verification devices.

As will be described below in further details, in one or more embodiments, the allocated subtasks will all result in a failure to determine a solution to the block verification computation task, except for one subtask which will result in a determined solution to the block verification computation task. In such case, it may only be necessary to obtain the successful result(s) that solve the block verification computation task, to make a determination that the digital data block is verified (55).

In other embodiments, respective block verification results may be received from each selected block verification device over the computer network.

Further to the receiving of the block verification results, whether such results are received from only one selected block verification device or from respective results are received from a plurality, possibly each, of the selected block verification devices, a determination (55) may be made that the block is verified.

The verified block may be added (56) to the blockchain-enabled storage system further to the determination that the block is verified.

In some embodiments, such determination may comprise a determination to decide whether or not the digital data block is verified, based on the received verification results. For example, the determining that the digital data block is verified, based on the received verification results may comprise in some embodiments a combining of the respective verification results to generate an aggregate verification result.

In the case where it is determined that the digital data block is verified, the verified block may be added to the blockchain-enabled storage system responsive to the determination.

Figure 3A:
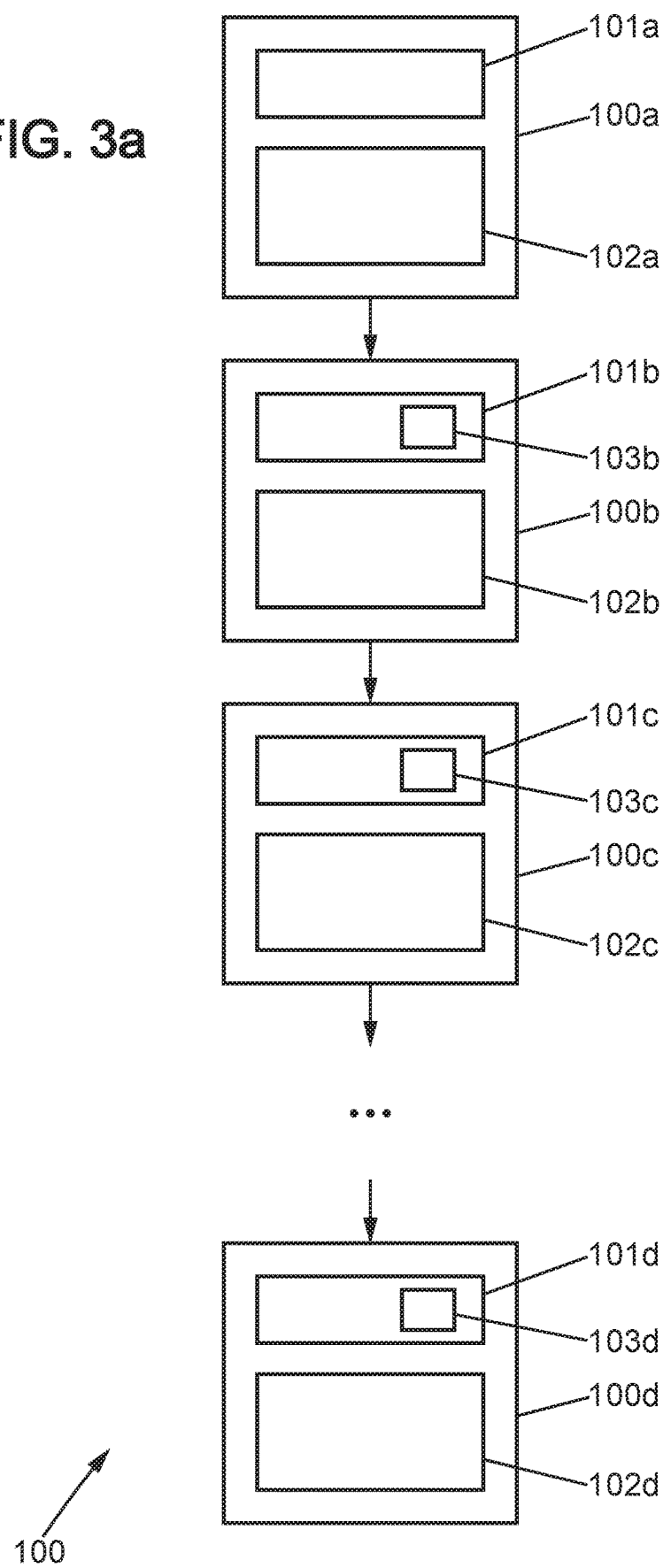
FIG. 3a shows an exemplary architecture of a blockchain data set.

FIG. 3a illustrates an exemplary architecture of a blockchain-enabled storage system which may be used in the proposed system, computer program product, and method of the present subject disclosure.

FIG. 3a shows a blockchain (100), that is, a set of data blocks which form a sequence of blocks stored as a ledger in a memory. New blocks are appended to the end of the sequence, and except for the first block (initial block, sometimes referred to as the "genesis block" of the blockchain) of the sequence, each block (100a, 100b, 100c, 100d) of the sequence includes a link to its parent block in the sequence. In the example illustrated on FIG. 3a, a genesis block (100a) is parent of a first block (100b), which is itself parent of a second block (100c), and the sequence of blocks continues until a nth block (100d), whose parent block is the n−1th block of the sequence.

Each block of the sequence may have a same data structure, and may include a header part (101a-101d) and a payload part (102a-102d). The coupling of a block to its parent block may be performed through a digital print (e.g. a hash value obtained as a result of a hash function (e.g. SHA-256) applied to data of the parent block) of data of the parent block (103b-103d) included in the header of the block.

Figure 3B:
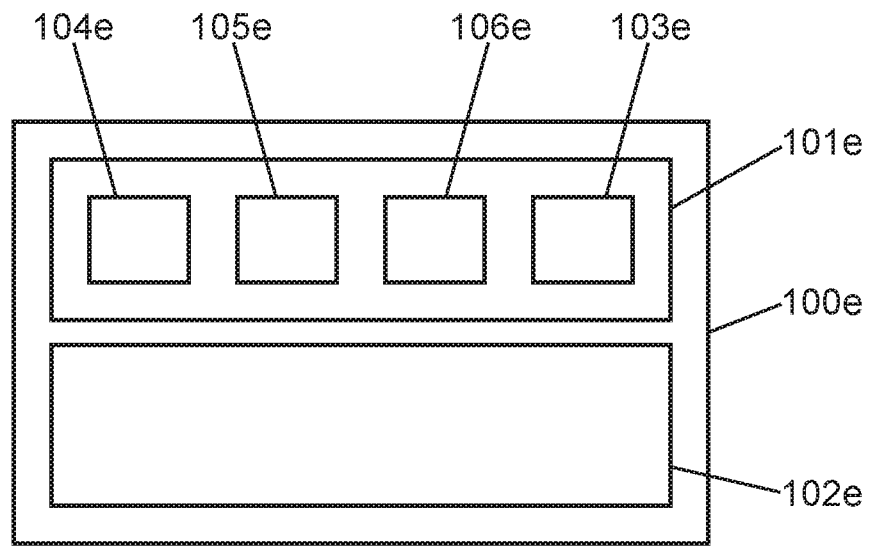
FIG. 3b shows an exemplary architecture of a block in a blockchain data set.

FIG. 3b illustrates in further details an exemplary architecture of a block which may be used in the proposed system, computer program product, and method of the present subject disclosure.

Shown on FIG. 3b is a block (100e) which comprises a header (101e) and a payload (102e), as described above with reference to FIG. 3a. The block header (101e) includes a digital print of data included in the parent block (103e) of the block (100e), a sequence number (104e) (also called "block height"), in the form of an integer value that represents the rank of the block (100e) in the sequence of blocks starting with a genesis block of predetermined rank (e.g. 0 or 1), each block bearing the sequence number of its parent block to which an increment value (e.g. 1) has been added, timestamp data (105e), which may be data representing a date and/or a time, expressed as a number of seconds elapsed as of a reference time (e.g. Jan. 1, 1970), a digital print (106e) of data included in the block, a nonce value (106e), in the form of a 4-byte field, which may be determined as part of the task work for verifying the block (100e).

The payload (102e) of the block (100e) may include transaction data, such as energy transfer transactions, between devices.

In one or more embodiments, the digital print function used for the blockchain may be a hash function, such as, for example a cryptographic hash function, which maps data of a block to a unique fixed-size hash value. A cryptographic hash function may advantageously be used as digital print function for the blockchain as it holds the following properties that are well suited for the design of a computationally expensive mathematical problem to be solved with respect to a new block: Cryptographic hash functions are deterministic, so the same message always results in the same hash. It is infeasible to generate a message from its hash value except by trying all possible messages, which represents a computationally very expensive task. Further, a small change to a message would change the hash value so extensively that the new hash value appears uncorrelated with the old hash value. Lastly, it is infeasible to find two different messages with the same hash value.

Examples of cryptographic hash function that may be used in embodiments of the present subject disclosure include MD5, the Secure Hash Algorithm family of functions SHA-1, the Secure Hash Algorithm family of functions SHA-2 (including SHA-256), the Secure Hash Algorithm family of functions SHA-3, RIPEMD-160, Whirlpool, and BLAKE2.

A device (e.g. a vehicle, or any electronic device operating with a rechargeable battery) may receive electrical charge from various sources and various technologies (contactless, by cable . . . ) during the course of its activity. Each exchange of charge may be defined as a transaction between the device and the charge source.

A data block may be formed based on each transaction, or on a plurality of transactions in which the device was involved, which must be verified before it is added to a blockchain-enabled transaction ledger.

The blockchain system may comprise a plurality of nodes of a computer network, each storing a copy of the blockchain.

Referring back to the exemplary system (10) of FIG. 1, some or all of the devices (D1-D6) registered as members of the charging device community (12) may be such nodes of the computer network that store a copy of the blockchain.

In some embodiments, only the devices members of the charging device community (12) registered with a profile indicating that they may be selected as member of a device cohort, may store a copy of the blockchain.

The addition of a new verified block to the blockchain-enabled transaction ledger may include the updating of each copy of the blockchain locally stored at a member of the charging device community (12) with the newly added block.

The consensus protocol used in blockchain systems aims at ensuring that ledger copies hold by a plurality of respective nodes are identical.

A work task, typically consisting in computer calculations, is designed to verify the block, and ensure that the device with the new block is not likely to attack the blockchain-enabled transaction ledger with a malicious block. In some embodiments, the task may comprise the calculation of a hash value of the data of the new block, to which the above-described nonce value has previously been added.

The hash value calculation may be performed using a cryptographic hash algorithm using iterations, with the nonce value being set to 0 at the first iteration, and being increased (e.g. incremented by a predetermined increment step) at each iteration. As discussed above with respect to the properties of the cryptographic hash functions, even a small change in the data block, such as the incrementing of the nonce, will result in a different hash value. The work task to be performed may therefore be seen as an inverse hash calculation, as it aims at determining the correct nonce value so that the hash computation result is less than a given threshold, called difficulty. The nonce may be increased at each hash calculation iteration, as long as the computation result is not smaller than the imposed difficulty.

The task is completed once a hash smaller than or equal to the imposed difficulty is calculated. The block with the determined nonce value may then be distributed to devices of the blockchain system so that the hash calculation can be validated.

In some embodiments, each block may be verified by a (typically large) randomly selected group of charging devices, before it can be added to the transaction ledger. The selected devices contribute to a work task (such as a calculation) to verify a block.

The blockchain-enabled transaction ledger (15) may be managed by a server (14), which may be implemented in a central manner or in a distributed manner (e.g. as cloud-based server).

Figure 4:
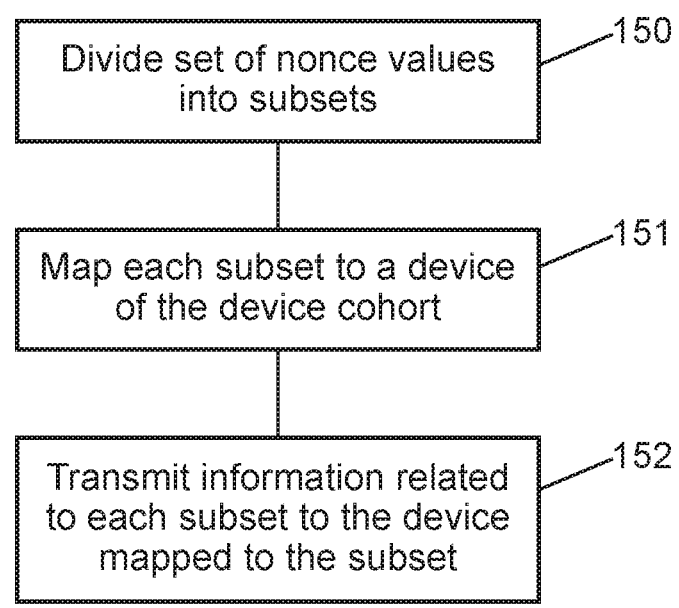
FIG. 4 is a block diagram of an exemplary process of partitioning a task work in accordance with one or more embodiments.

FIG. 4 illustrates an exemplary scheme for distributing a block verification work task among the plurality of randomly selected devices that forms the device cohort.

In one or more embodiments, the partitioning of the block verification computation task for a digital data block into a plurality of block verification computation subtasks may be based on a partitioning of the set of nonce values to be tested.

In particular, in some embodiments, the mining calculation to validate the Nth block can be distributed in the following way:

The set of nonce values may be divided (150) into subsets, based on the number of nonce values R in the set of nonce values, and on the number of devices N in the device cohort. In some embodiments, the division into subsets may be a partition, in that the set of nonce values may be divided into disjoint subsets, that is, so that two subsets have no nonce value in common. Depending on the embodiment, the division of the set of nonce values may result into subsets of equal size, or into subsets of different sizes. Preferably, the division of the set of nonce values will be performed through a division into continuous subsets, each corresponding to a sub-range of the range of nonce values, as exemplified below.

The size(s) of the subsets may also be adjusted once the subsets are created, for example for defining larger subsets by merging two subsets resulting from the initial division, or vice-versa.

Once defined, each subset of nonce values may be mapped (151) with a device in the device cohort, so that it can be allocated to such device as part of the subtask assigned to such device. Depending on the embodiment, the mapping may associate a device of the device cohort with only one subset of nonce values, or it may associate a device of the device cohort with several subsets.

For instance, assuming that the total range cardinal set is R—for example $R=2^{32}$ for a set of 4 bytes nonce values—and the number of devices in the device cohort is M, the member n°i of the device cohort will be assigned the subtask to test successively all the nonce values of the range(i) interval, where $$\text{range}(i) = \left[(i-1) \cdot \frac{R}{M}, i \cdot \frac{R}{M} - 1\right].$$

Doing so, the whole range R of nonce values can be advantageously tested in a parallel way with no redundant collision.

As a consequence, when using disjoints nonce value intervals, the execution of the subtasks can be performed in parallel, without any replication of computations among different members of the device cohort.

For example, the i-th member of the device cohort may then be requested to test the value Hash(block(N)+$nonce_i$), where $nonce_i \in $range(i), in order to check if Hash (block (N)+$nonce_i$)=«00000000rest-of-the-hash-signature».

In the case where Hash (block (N)+$nonce_i$=«00000000rest-of-the-hash-signature», the mining is done, that is, the work task has been completed by the i-th member of the device cohort.

For example, in a case where N=4 (that is, 4 devices are selected in the device cohort), and R=1024 (that is, 1024 nonce values are to be tested):

The member 1 of the device cohort will be assigned as subtask to test all the nonce values in the range [0,255].

The member 2 of the device cohort will be assigned as subtask to test all the nonce values in the range [256,511].

The member 3 of the device cohort will be assigned as subtask to test all the nonce values in the range [512,767].

The member 4 of the device cohort will be assigned as subtask to test all the nonce values in the range [768,1023].

The length of the hash and the number of zeros at the beginning of the signature can be used as an indicator of the complexity of the mining function, therefore providing a trade-off parameter between complexity/trustability for the blockchain.

Information related to each subset may then be transmitted (152) to the device mapped to the subset as a subtask assignment. Each device receiving such information may define the subset and proceed to test all the nonce values included in the subset.

Referring back to the exemplary system of FIG. 1, in some embodiments, each set range(i), or parameters from which the set range(i) can be obtained, may be communicated by the server (14) through a communication protocol, to the corresponding member i of the device cohort as a way for each mining device to obtain the range range(i) where to select its nonces values to be tested.

In the above examples, an equal division/partition of the nonce space is proposed, that corresponds to some embodiments.

In other embodiments, other strategies to partition the whole nonce value set may be used, leading to non-equal partitions of the nonce space. For example, ranges of nonce values that may be assigned to respective devices for performing their subtask may depend on calculation power, battery state charge, and/or availability of the respective devices as discussed below, but also on other criteria such as a level of trustability associated with the device. Depending on the embodiment, the device consensus algorithm function (14c) may be configured (including preconfigured or dynamically configured) to allocate subtasks to selected cohort devices (i.e. devices selected by the cohort selection function to be part of the device cohort) according to none, or one or more of these criteria.

Once the subtask allocated to each member of the device cohort is completed, such member may provide its calculation results to the system, for example to a server thereof through a computer network. As discussed above, the calculation results for each member may either be a success in completing the work task, or a failure in completing the work task.

A determination that the digital data block is verified may then be made, which may in some embodiments include validating the hash block value obtained with the determined nonce value. In other embodiments, the determination may be limited to verifying that the work task was completed with a success from one of the members of the device cohort.

Once the new block is determined to be verified, it may be added to the blockchain that is, provided to community member devices holding a copy of the ledger so that their respective copy may be updated with the new block.

In one or more embodiments, the selecting the block verification devices may further comprise the selecting, in the subgroup of block verification devices, a plurality of candidate block verification devices. This pre-selection of candidate block verification devices may advantageously be used for an adaptive assignment of computation subtasks based on the capabilities of the pre-selected devices.

Verification resource information may indeed be obtained for one or more of the preselected devices. In some embodiments, such verification resource information may include an indication of an ability to be a resource for the verification of the new block. The verification resource information may in some embodiments be processed to determine whether a computation subtask can be allocated to a respective pre-selected device, and in the positive, what type of computation subtask. In other embodiments, to the extent the verification resource information allows the assignment of a subtask to the respective device, such subtask may be designed, for example dimensioned from a computation expense standpoint, based on the verification resource information.

In this manner, a block verification computation subtask may advantageously be designed and/or assigned to a candidate block verification device based on the verification resource information of such candidate.

In some embodiments, the verification resource information for the candidate block verification device may be obtained from a database stored in one or more nodes of the computer network. Depending on the embodiment, the database may be distributed over a plurality of nodes of the computer network, or stored in a server holding up-to-date verification resource information data for community member devices.

In other embodiments, the verification resource information for the candidate block verification device may be obtained directly from the candidate block verification device. For example, the verification resource information for the candidate block verification device may be obtained from a response message received from the candidate block verification device, further to a transmission to the candidate block verification device of a query message for the verification resource information.

Depending on the embodiment, the verification resource information may comprise battery charge status information indicating a status of battery charge of the pre-selected candidate block verification device, computation power information indicating computational capabilities of the pre-selected candidate block verification device, and/or occupation status information indicating a state of computation occupation of the pre-selected candidate block verification device.

In one or more embodiments, the verification resource information may include computation power information indicating computational capabilities for a respective candidate block verification device, and respective verification resource information may be obtained for a plurality of candidate block verification devices. In such embodiments, the plurality of candidate block verification devices may be selected to generate a plurality of subsets of candidate block verification devices having respective computational capabilities, wherein each subset of candidate block verification devices represents a respective predetermined proportion of the selected plurality of candidate block verification devices. For example, the selection of devices for constituting the device cohort may be performed under the constraint that one third of the selected devices have high computational capabilities, one third of the selected devices have medium computational capabilities, and one third of the selected devices have low computational capabilities. As another example, the selection of devices for constituting the device cohort may be performed under the constraint that in one half the selected devices have high computational capabilities, and in the other half selected devices have medium and/or low computational capabilities.

In one or more embodiments, the verification resource information may include occupation status information indicating a state of computation occupation for a respective candidate block verification device, and the selection of the plurality of candidate block verification devices among the candidate block verification devices may give priority to devices with occupation status information of which indicating an idle computation occupation. In some embodiments, only devices with occupation status information of which indicating an idle computation occupation and/or a low computation occupation may be selected.

In one or more embodiments, the verification resource information may include battery charge status information indicating a battery charge level for a respective candidate block verification device, and the selection of the plurality of candidate block verification devices among the candidate block verification devices may give priority to devices with a battery charge level beyond a battery charge level threshold. In some embodiments, only devices with a battery charge level beyond the battery charge level threshold may be selected.

Depending on the embodiment, the battery charge level threshold may be predetermined, or dynamically determined, for example based on a block verification computation subtask under consideration for allocation to the device.

Figure 5:
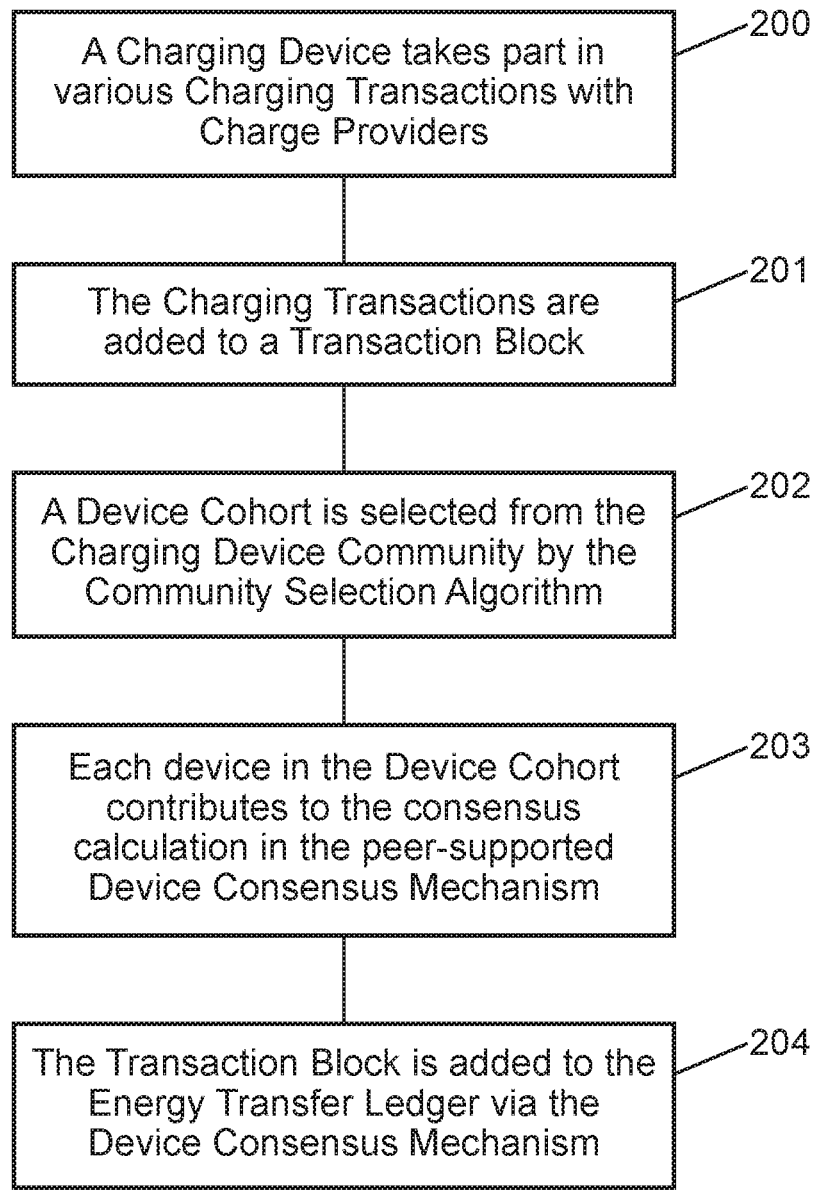
FIG. 5 is a block diagram illustrating a proposed method according to one or more embodiments.

FIG. 5 illustrates a method according to one or more embodiments of the present subject disclosure, which may be used for enabling a device-managed peer-to-peer energy transfer system such as that shown on FIG. 1.

The proposed method advantageously allows users to sell and acquire energy via a device (such as an electric vehicle), where transactions undertaken by that device are verified and recorded by other devices in the network through the proposed consensus mechanism.

In the following, embodiments of the present subject disclosure will be described using the non-limiting example of a device embarking on a journey and taking part in various charging transactions with a distributed network of charge providers (200). The charge providers may be other community members of the charging device community, and/or devices external to the charging device community.

The likelihood of the device taking part in a charging transaction and its behaviour during the transaction may, for example, be determined and controlled by various user-specified permissions, such as a maximum spend amount per day/week etc., preferred charging locations or times, and/or charge acquisition linked to a certain percentage of energy depletion.

In some embodiments, at a given point in time (e.g. at the end of the day or journey), each charging transaction the device has taken part in may be compiled into a transaction block (201), for example by a transaction block creation unit. The transaction block is associated with a new work task which must be completed in order to add that block to an energy transfer ledger.

A device cohort may then be selected (202) from the charging device community at random, for example by a cohort selection unit executing a cohort selection algorithm. Depending on the embodiment, the cohort selection may use broad selection criteria to choose the device cohort, for example including: selecting only those community members who have received charge within the same time period, and/or selecting only those community members who have received and provided charge within a certain time period.

Depending on the embodiment, the following device cohort selection strategies may be used, alone or in combination.

Those strategies may use the notion of calculation power of the device. For instance, one can assume that the calculation power of a potentially selectable electrical vehicle device may largely differ depending on the type of vehicle being part of the community. For example the calculation power of an electric car may be much higher than that of an electric scooter. In some embodiments, a candidate to a selection in the device cohort may transmit to the one or several network nodes running the cohort selection algorithm data indicating its calculation power capacity and/or data indicating its occupation state so that the following strategy options may be exercised.

The range allocation strategy may also adapt to this capabilities to balance the calculations task according a good trade off mining success time vs security.

As an example, related to the previous one, assuming that only 3 devices out of 4 have enough power calculations capabilities, the selected range might be:

Assuming N=3 and R=1024:

The member 1 of the device cohort which is the more powerful will test all the nonce in the range [0,511].

The member 2 of the device cohort will test all the nonce in the range [512,767].

The member 4 of the device cohort will test all the nonce in the range [768,1023].

In some embodiments, the device cohort may also be randomly constituted with devices by mixing a fair proportion of high calculation power capacity devices, middle calculation power capacity devices, and/or low calculation power capacity devices, so as to advantageously reduce the probability of high mining time.

In some embodiments, the device cohort may also be randomly constituted among currently idle devices, so that the selected devices may be in a position to dedicate almost their full calculation capacity to solve the subtask assigned to them.

In some embodiments, the device cohort may also be randomly constituted by mixing currently idle devices with currently busy ones to ensure enough calculation power for completing the work task.

Depending on the embodiment, any of the above device cohort selection strategies, or a combination thereof, may be used for selecting the devices that collectively participate to the completion of the work task.

In some embodiments, the subtask assignment strategy may take into account the remaining electric power available at a selectable device in order to ensure that only devices that have enough available power (either through a power line connection or through their remaining battery power) are selected for performing a subtask assigned to them. This will advantageously ensure that the devices running on a battery don't empty their battery by executing the subtask assigned to them.

In some embodiments, the cohort selection function (14*a*) may be configured to address or anticipate a case where a first (initial) random selection of devices does not lead to a device cohort with devices collectively having enough battery or computation power to perform the work task. For example, the cohort selection function (14*a*) may be configured for assigning respective priority levels to the additional criteria potentially used to select the devices of the device cohort. In some embodiments, the priority levels may be used for each selection of devices of the device cohort, including the initial one. Alternatively, the priority levels may be used to increase the number of selected devices in the case where the first (initial) random selection of devices does not lead to a device cohort with devices collectively having enough battery or computation power to perform the work task.

Using the above-described exemplary criteria, a priority level 1 may be assigned to the battery charge status of each device, a priority level 2 may be assigned to the computational capabilities of each device, and a priority level 3 may be assigned to the occupation status of each device, where priority level 1>priority level 2>priority level 3.

In one or more embodiments, each member of the device cohort takes part (203) in the device consensus mechanism. The device cohort collectively completes the work task associated with the current transaction block, with each of the many devices contributing a small part of the total work task, assigned to such device possibly using one or several of the above strategies.

The energy requirement of the work task on each member of the device cohort may therefore be negligible. As a consequence, in some embodiments, a checking that such energy requirement is not beyond the available power level of the respective device may be performed with a very low available power threshold, while requiring from the device as mandatory that the assigned subtask be performed. Devices may therefore not escape their contributing to the work task, for example by showing most of the time a battery level below the available power threshold used by the system.

In one or more embodiments, the proposed device consensus mechanism produces a trusted consensus and the transaction block is added (204) to the energy transfer ledger.

Advantageously, the consensus can be trusted because the many randomly selected devices in the device cohort are independent and unable to collude. A single entity cannot control sufficient numbers of the many randomly selected devices that would be required to fraudulently alter the energy transfer ledger.

Figure 6A:
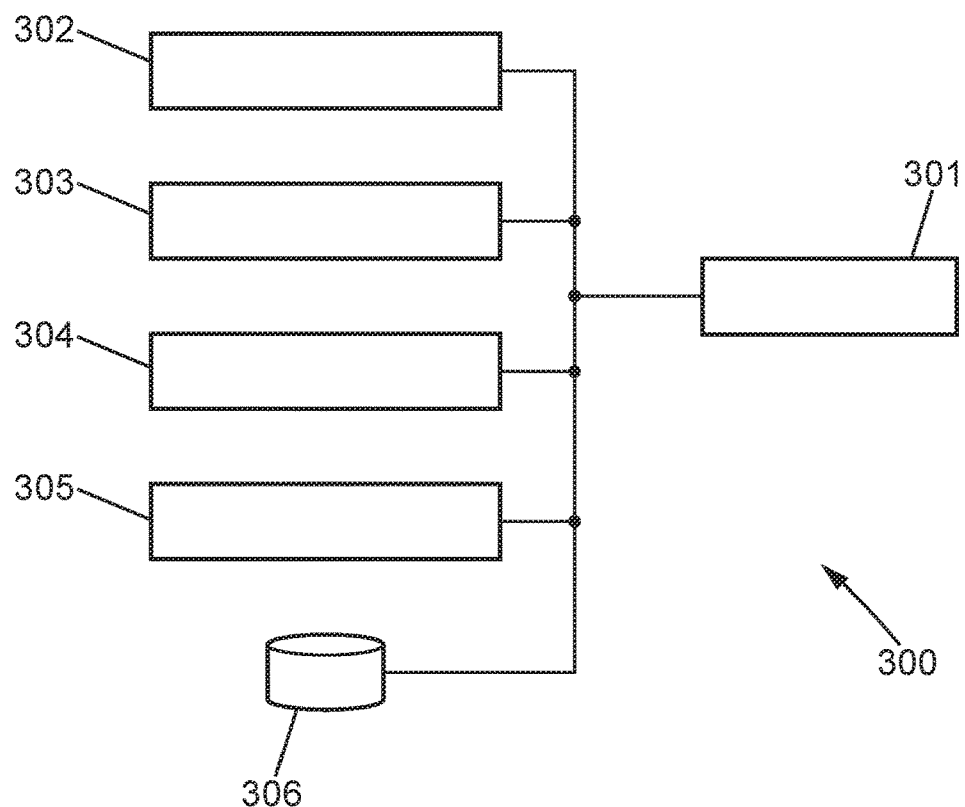
FIG. 6a illustrates an exemplary apparatus according to one or more embodiments.

FIG. 6a illustrates an exemplary apparatus 300 configured to use a transaction data processing feature in accordance with embodiments of the present subject disclosure.

The apparatus 300 includes a control engine 301, a cohort selection engine 302, a transaction block creation engine 303, a device consensus management engine 304, a data communication engine 305, a memory 306, and a power supply (e.g., a battery, plug-in power supply, etc.) (not represented on the figure).

In the architecture illustrated on FIG. 6a, all of the cohort selection engine 302, transaction block creation engine 303, device consensus management engine 304, data communication engine 305, and memory 306 are operatively coupled with one another through the control engine 301.

In one or more embodiments, the cohort selection engine 302 is configured to perform various aspects of embodiments of the cohort selection algorithm as described herein.

In one or more embodiments, the transaction block creation 303 is configured to perform various aspects of embodiments of the transaction block creation as described herein.

In one or more embodiments, the device consensus management engine 304 is configured to perform various aspects of embodiments of the device consensus scheme as described herein.

In one or more embodiments, the data communication engine 305 is configured to receive and transmit data packets or messages, and process received data.

The control engine 301 includes one or more computers, each including at least a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 301 may also comprise, or may be in communication with, computer storage media, such as, without limitation, the memory 306, capable of storing computer program instructions or software code that, when executed by a processor, causes the processor to perform the elements described herein. In addition, the memory 306 may be any type of data storage computer storage medium, coupled to the control engine 301 and operable with the data communication engine 305, the cohort selection engine 302, the transaction block creation engine 303, and the device consensus management engine 304, to facilitate management and processing of data stored in association therewith.

In embodiments of the present subject disclosure, the apparatus 300 is configured for performing the transaction data processing methods described herein.

It will be appreciated that the apparatus 300 shown and described with reference to FIG. 6a is provided by way of example only. Numerous other architectures, operating environments, and configurations are possible. Other embodiments of the apparatus may include fewer or greater number of components, and may incorporate some or all of the functionality described with respect to the apparatus components shown in FIG. 6a. Accordingly, although the control engine 301, cohort selection engine 302, transaction block creation engine 303, device consensus management engine 304, data communication engine 305, and memory 306 are illustrated as part of the apparatus 300, no restrictions are placed on the location and control of those components 301-305. In particular, in other embodiments, such components 301-305 may be part of different entities or computing systems.

Figure 6B:
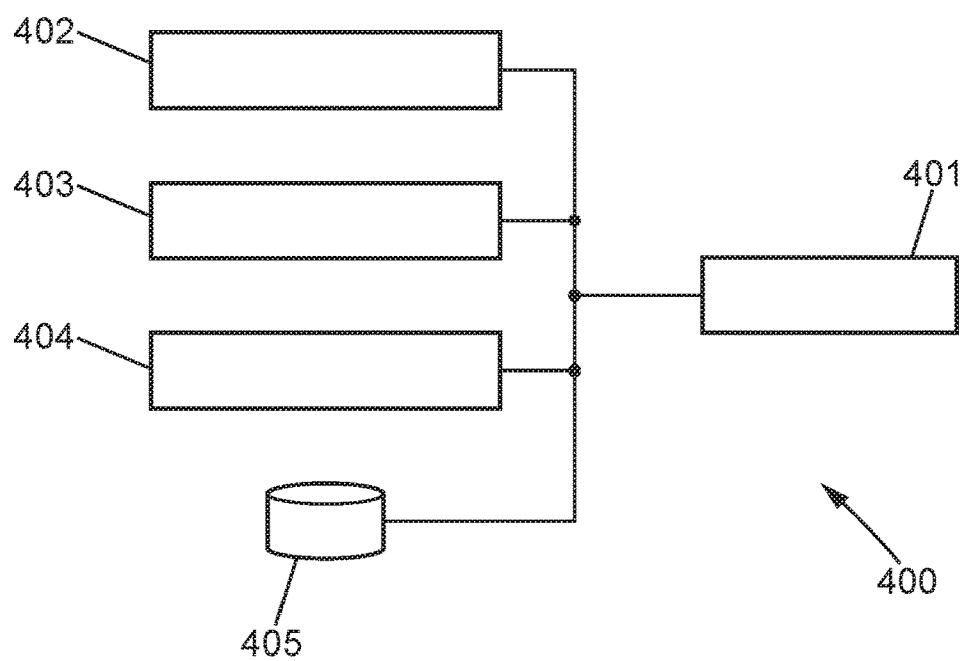
FIG. 6b illustrates an exemplary device according to one or more embodiments.

FIG. 6b illustrates an exemplary device 400 configured to use a transaction data processing feature in accordance with embodiments of the present subject disclosure.

The device 400 includes a control engine 401, a subtask processing engine 402, a ledger management engine 403, a data communication engine 404, a memory 405, and a power supply (e.g., a battery, plug-in power supply, etc.) (not represented on the figure).

In the architecture illustrated on FIG. 6b, all of the subtask processing engine 402, ledger management engine 403, data communication engine 404, and memory 405 are operatively coupled with one another through the control engine 401.

In one or more embodiments, the subtask processing engine 402 is configured to perform various aspects of embodiments of the proposed method for subtask completion as described herein. In particular, the subtask processing engine 402 may be configured to process a received subtask assignment for a new block to complete the subtask.

In one or more embodiments, the ledger management engine 403 is configured to perform various aspects of embodiments of the proposed method as described herein. In particular, the ledger management engine 403 may be configured to maintain current a copy of an energy transfer ledger in the form of a blockchain, including by adding thereto a new block that has been verified, and to participate in the determining that the work task has been successfully completed.

In one or more embodiments, the data communication engine 404 is configured to receive and transmit data packets and/or message, and process received data.

The control engine 401 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. The control engine 401 may also comprise, or may be in communication with, computer storage media, such as, without limitation, the memory 405, capable of storing computer program instructions or software code that, when executed by the processor, causes the processor to perform the elements described herein. In addition, the memory 405 may be any type of data storage computer storage medium, capable of storing a data structure representing a blockchain as well as information related to the device 400, such as, for example, the verification resource information described above, coupled to the control engine 401 and operable with the data communication engine 404, the subtask processing engine 402, and the ledger management engine 403 to facilitate management and processing of data stored in association therewith.

It will be appreciated that the device 400 shown and described with reference to FIG. 6b is provided by way of example only. Numerous other architectures, operating environments, and configurations are possible. Other embodiments of the node may include fewer or greater number of components, and may incorporate some or all of the functionality described with respect to the device components shown in FIG. 6b. Accordingly, although the control engine 401, subtask processing engine 402, ledger management engine 403, data communication engine 404, and memory 405 are illustrated as part of the device 400, no restrictions are placed on the location and control of these components 401-405. In particular, in other embodiments, such components 401-405 may be part of different entities or computing systems.

Advantages of the embodiments according to the present subject disclosure include the following:

A secure blockchain consensus mechanism based on the concept that it is essentially impossible to gain control of a sufficient number of devices in a large, randomly selected cohort in order to maliciously affect new transactions, is provided.

A consensus mechanism with a low device work requirement to achieve consensus, with each contributing a small amount of work to the overall consensus calculation, is provided.

A consensus mechanism with a lower overall work requirement than known consensus mechanisms (i.e. PoW, PoS) is provided. Security is achieved through the use of many devices, rather than through the complexity of the calculation or size of a stake.

A method to enable peer-to-peer energy trading using device-to-device transactions that require little to no human oversight is provided.

Peer-to-peer energy transactions are advantageously enabled by a blockchain consensus mechanism that utilises a multitude of devices to achieve consensus in a way that is prohibitively difficult to maliciously control.

Specifically, the following advantages are enabled:

Secure transaction records are enabled through the participation of many devices in a blockchain-based verification process. The large number of randomly selected devices taking part in the consensus mechanism prevents fraudulent adjustments to the transaction ledger.

The energy requirement per device needed to reach consensus via the described method is small, ensuring that the impact on contributing devices is minimised and the overall energy efficiency of the process compared to Proof of Work mechanisms is improved.

Peer-to-peer energy trading is enabled in a way that maximises the user's capacity to sell energy, while maintaining a secure and verifiable record of the transactions that take place with minimum user effort.

Vehicle owner convenience is further increased by the ability of the electric vehicle to easily acquire charge in small bursts as required during the course of a journey, and for those transactions to be automatically and securely recorded by a blockchain.

While the invention has been described with respect to preferred embodiments, those skilled in the art will readily appreciate that various changes and/or modifications can be made to the invention without departing from the spirit or scope of the invention as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A computer-implemented method, comprising
generating a digital data block comprising transaction data representing at least one energy transfer transaction corresponding to an exchange of charge between an electric vehicle and a charge source device;
randomly selecting, in a group of community member devices that includes the electric vehicle, a plurality of block verification devices, wherein the block verification devices form a subgroup of block verification devices;
partitioning a block verification computation task for the digital data block into a plurality of block verification computation subtasks;
assigning the block verification computation subtasks to respective selected block verification devices of the subgroup of block verification devices;
transmitting the digital data block to each selected block verification device, together with its respective block verification computation subtask over a computer network;
determining that the digital data block is verified, based on at least one verification results of a corresponding block verification computation subtask; and
adding the verified block to a blockchain-enabled storage system,
wherein each device of the group of community member devices requires electric charge to function and/or is capable of providing electric charge to other devices, and
wherein each device of the group of community member devices has the capability to connect to the computer network, and includes a computer system which is a node of the computer network,
wherein the selecting the block verification devices further comprises:
selecting, in the subgroup of block verification devices, a plurality of candidate block verification devices;
obtaining, for at least one of the candidate block verification devices, verification resource information indicating an ability of the at least one candidate block verification device to be a resource for a block verification;
wherein the assigning the block verification computation subtasks to respective selected block verification devices comprises: assigning a block verification computation subtask to the candidate block verification device with prioritization based on the verification resource information to reduce energy expenditure by the candidate block verification device for the assigned block verification computation subtask, and
wherein the verification resource information includes one or more of battery charge status information indicating a status of battery charge for prioritization of devices with a battery charge level beyond a battery charge level threshold, computation power information indicating computational capabilities for prioritization of devices with a relatively higher calculation power capacity, or occupation status information indicating a state of computation occupation for prioritization of currently idle devices.

2. The method according to claim 1, wherein the energy transfer transaction includes a transfer of charge to the electric vehicle from the charge source device, wherein the charge source device is an in-road inductive charger, a wired charger, or a charge source vehicle.

3. The method according to claim 1, further comprising: assigning to each selected block verification device a respective subset of nonce values to be tested by the selected block verification device, and transmitting to each selected block verification device information related to its assigned subset of nonce values.

4. The method according to claim 3, wherein the respective subset of nonce values is selected based on the verification resource information.

5. The method according to claim 1, wherein each block verification device of the subgroup of at least one block verification device is selected in a subgroup of active devices of the group of community member devices, wherein each active device of the subgroup of active devices has taken part in a charge transaction within a predetermined time period.

6. The method according to claim 1, wherein the verification resource information includes computation power information indicating computational capabilities for a respective candidate block verification device, and respective verification resource information is obtained for a plurality of candidate block verification devices, the method further comprising: selecting the plurality of candidate block verification devices to generate a plurality of subsets of candidate block verification devices having respective computational capabilities, wherein each subset of candidate block verification devices represents a respective predetermined proportion of the selected plurality of candidate block verification devices.

7. The method according to claim 1, wherein the verification resource information includes occupation status information indicating a state of computation occupation, the method further comprising: selecting the plurality of candidate block verification devices among the candidate block verification devices the occupation status information of which indicates an idle computation occupation.

8. The method according to claim 1, wherein the verification resource information includes battery charge status information indicating a battery charge level, the method further comprising: selecting the plurality of candidate block verification devices among the candidate block verification devices with a battery charge level beyond a battery charge level threshold.

9. The method according to claim 8, wherein the battery charge level threshold is dynamically determined based on a candidate block verification computation subtask.

10. The method according to claim 1, wherein each of the block verification computation subtask is assigned to a respective selected block verification device.

11. The method of claim 1, wherein the battery charge level threshold is dynamically determined based on a block verification computation subtask under consideration for allocation to the candidate block verification device.

12. An apparatus, the apparatus comprising a processor and a memory operatively coupled to the processor, wherein the processor is configured to perform a method comprising:
generating a digital data block comprising transaction data representing at least one energy transfer transaction corresponding to an exchange of charge between an electric vehicle and a charge source device;
randomly selecting, in a group of community member devices that includes the electric vehicle, a plurality of block verification devices, wherein the block verification devices form a subgroup of block verification devices;
partitioning a block verification computation task for the digital data block into a plurality of block verification computation subtasks;
assigning the block verification computation subtasks to respective selected block verification devices of the subgroup of block verification devices;
transmitting the digital data block to each selected block verification device, together with its respective block verification computation subtask over a computer network;
determining that the digital data block is verified, based on at least one verification results of a corresponding block verification computation subtask; and
adding the verified block to a blockchain-enabled storage system,
wherein each device of the group of community member devices requires electric charge to function and/or is capable of providing electric charge to other devices, and
wherein each device of the group of community member devices has the capability to connect to the computer network, and includes a computer system which is a node of the computer network,
wherein the selecting the block verification devices further comprises:
selecting, in the subgroup of block verification devices, a plurality of candidate block verification devices;
obtaining, for at least one of the candidate block verification devices, verification resource information indicating an ability of the at least one candidate block verification device to be a resource for a block verification;
wherein the assigning the block verification computation subtasks to respective selected block verification devices comprises: assigning a block verification computation subtask to the candidate block verification device with prioritization based on the verification resource information to reduce energy expenditure by the candidate block verification device for the assigned block verification computation subtask, and
wherein the verification resource information includes one or more of battery charge status information indicating a status of battery charge for prioritization of devices with a battery charge level beyond a battery charge level threshold, computation power information indicating computational capabilities for prioritization of devices with a relatively higher calculation power capacity, or occupation status information indicating a state of computation occupation for prioritization of currently idle devices.

13. The apparatus according to claim 12, wherein the energy transfer transaction includes a transfer of charge to the electric vehicle from the charge source device, wherein the charge source device is an in-road inductive charger, a wired charger, or a charge source vehicle.

14. The apparatus according to claim 12, wherein the processor is further configured to: assign to each selected block verification device a respective subset of nonce values to be tested by the selected block verification device, and transmitting to each selected block verification device information related to its assigned subset of nonce values.

15. The apparatus according to claim 12, wherein each block verification device of the subgroup of at least one block verification device is selected in a subgroup of active devices of the group of community member devices, wherein each active device of the subgroup of active devices has taken part in a charge transaction within a predetermined time period.

16. A non-transitory computer-readable medium encoded with executable instructions which, when executed, causes an apparatus comprising a processor operatively coupled with a memory, to perform a method comprising:
generating a digital data block comprising transaction data representing at least one energy transfer transaction corresponding to an exchange of charge between an electric vehicle and a charge source device;
randomly selecting, in a group of community member devices that includes the electric vehicle, a plurality of block verification devices, wherein the block verification devices form a subgroup of block verification devices;
partitioning a block verification computation task for the digital data block into a plurality of block verification computation subtasks;
assigning the block verification computation subtasks to respective selected block verification devices of the subgroup of block verification devices;
transmitting the digital data block to each selected block verification device, together with its respective block verification computation subtask over a computer network;
determining that the digital data block is verified, based on at least one verification results of a corresponding block verification computation subtask; and
adding the verified block to a blockchain-enabled storage system,
wherein each device of the group of community member devices requires electric charge to function and/or is capable of providing electric charge to other devices, and
wherein each device of the group of community member devices has the capability to connect to the computer network, and includes a computer system which is a node of the computer network,
wherein the selecting the block verification devices further comprises:
selecting, in the subgroup of block verification devices, a plurality of candidate block verification devices;
obtaining, for at least one of the candidate block verification devices, verification resource information indicating an ability of the at least one candidate block verification device to be a resource for a block verification;
wherein the assigning the block verification computation subtasks to respective selected block verification devices comprises: assigning a block verification computation subtask to the candidate block verification device with prioritization based on the verification resource information to reduce energy expenditure by the candidate block verification device for the assigned block verification computation subtask, and
wherein the verification resource information includes one or more of battery charge status information indicating a status of battery charge for prioritization of devices with a battery charge level beyond a battery charge level threshold, computation power information indicating computational capabilities for prioritization of devices with a relatively higher calculation power capacity, or occupation status information indicating a state of computation occupation for prioritization of currently idle devices.

17. The non-transitory computer-readable medium according to claim 16, wherein the energy transfer transaction includes a transfer of charge to the electric vehicle from the charge source device, wherein the charge source device is an in- road inductive charger, a wired charger, or a charge source vehicle.

18. The non-transitory computer-readable medium according to claim 16, wherein the method further comprises: assigning to each selected block verification device a respective subset of nonce values to be tested by the selected block verification device, and transmitting to each selected block verification device information related to its assigned subset of nonce values.

19. The non-transitory computer-readable medium according to claim 16, wherein each block verification device of the subgroup of at least one block verification device is selected in a subgroup of active devices of the group of community member devices, wherein each active device of the subgroup of active devices has taken part in a charge transaction within a predetermined time period.

* * * * *